INVENTORS.
LENNART ANDERS PEHRSSON &
OLOF JOHAN GERHARD HEDBERG
BY their ATTORNEYS

United States Patent Office 3,380,536
Patented Apr. 30, 1968

3,380,536
PROPELLER SEALING DEVICE
Lennart Anders Pehrsson, Kristinehamn, and Olof Johan Gerhard Hedberg, Karlstad, Sweden, assignors to Aktiebolaget Karlstads Mekaniska, Werkstad, Karlstad, Sweden, a company of Sweden
Filed July 10, 1967, Ser. No. 652,285
9 Claims. (Cl. 170—160.23)

ABSTRACT OF THE DISCLOSURE

A sealing device for a variable-pitch blade of the type used in, for example, ship propellers, water turbines, and pumps, and in which the blade is mounted for pivotal movement in a blade-carrying member. The sealing device, which is located in an annular space between the blade and the blade-carrying member, comprises at least two sealing rings, one of which is fitted to and forms a seal with the member and the other of which is fitted to and forms a seal with the blade. The sealing rings are mounted for displacement relative to the blade and the blade-carrying member between two alternative positions, and two compressible seal elements are carried by the sealing rings in positions such that one is placed in operative sealing engagement when the sealing rings are in one of their alternative positions and the other is placed in operative sealing engagement when the sealing rings are in their other alternative position. A mechanism is provided to shift the sealing rings and thus to shift the sealing function from one of the compressible elements to the other upon, for example, some indication of wear or failure of the first compressible element.

BACKGROUND OF THE INVENTION

This invention relates to a sealing device for sealing the space between a variable-pitch blade and the blade-carrying member in such apparatuses as ship propellers, water turbines and pumps.

Because of their location, access to the blades of ship propellers, water turbines and pumps for purposes of overhaul and repair is usually difficult and requires time-consuming and expensive measures such as dry-docking, in the case of ships, or draining of fluid channels in the case of water turbines and pumps. It is, of course, desirable that the period of time between overhaul be as long as possible. In many instances, the time between overhaul is limited by the life of the sealing devices between the blade and the member in which the blades are mounted, such sealing devices being located between relatively movable surfaces and therefore being subject to wear and having a relatively short life. Generally, a ship cannot be dry-docked, or a fluid channel drained, at short notice and without causing great inconvenience. Consequently, the sealing device should be constructed so that any leakage can be stopped as quickly and easily as possible and complete overhauls postponed to a more suitable time, such as a regularly scheduled overhaul.

In addition to the necessity of dry-docking or drainage, as the case may be, it is also in many instances necessary with many presently known sealing devices to empty oil from the blade-carrying member and to remove the blades, although with some seals it is possible to replace the seals without removing the blades.

SUMMARY OF THE INVENTION

There is provided, in accordance with the present invention, a novel and improved sealing device having a long life and embodying features which enable it to be repaired quickly and easily with out having to remove the blades or empty the oil from the blade mounting. More particularly, the sealing device of the invention comprises at least two sealing rings, one of which is fitted to and forms a seal with the blade and the other of which is fitted to and forms a seal with the blade-carrying member. Preferably, each of the sealing rings is mounted non-rotatably on the member to which it is fitted. The sealing rings are both shiftable between alternative positions relative to the blade and the blade-carrying member. To compressible sealing elements are associated with the sealing rings in such a way that one is in operative sealing engagement when the sealing rings are in one of their alternative positions and the other is in sealing engagement when the sealing rings are in their other alternative position. In other words, the sealing device of the invention embodies two compressible sealing elements, each of which is operable alternately with the other. Accordingly, the sealing device may begin operation in the device with one of the sealing elements engaged and performing the seal function while the other remains idle. The sealing device further comprises a mechanism for selectively shifting the sealing rings to disengage one of the sealing elements and engage the other, thereby transferring the sealing function from one of the two compressible sealing elements to the other.

In a preferred embodiment, the sealing rings are located in an annular space defined between cylindrical surfaces of the blade and blade-carrying member concentric to the axis of pivotal movement of the blade, the space also having an undercut formed in either the blade or member. One of the sealing rings is mounted with a portion projecting into the undercut, and the other sealing ring is mounted in the recess axially adjacent the first ring. One of the compressible sealing elements is located between the two rings and forms a seal between them, while the other compressible sealing element is located between the first ring and a surface of the undercut facing a plane of the ring.

For example, the undercut portion of the annular space may be defined by an end surface of the blade, the first ring being located inwardly of the second ring, relative to the blade. In this instance, one of the compressible sealing elements is located between the two sealing rings for sealing engagement between them while the other is located between the first ring and the surface of the undercut facing it. Moreover, in this particular example, the first ring is fitted to and forms a seal with the blade carrying member while the second ring is fitted to and forms a seal with the blade.

The mechanism for shifting the sealing rings may be composed of springs biasing the rings in an outward direction, with respect to the axis of the blade-carrying member, and an adjustable member such as a lock-screw or system of coacting lock-screws and stops coupled to the outermost ring and acting against the biasing forces of springs. Regardless of the particular mechanism used to shift the rings, it is preferable that the mechanism be operable from a position externally of the blade and blade-carrying member so that adjustment can be made without having to disassemble the blade from the blade-carrying member.

The operation of the sealing mechanism may be better understood by considering, for the moment, that there are no sealing elements between the sealing rings and the blade and blade-carrying member. Referring to the specific example given in the preceding paragraph in which the undercut in the space between the blade and blade carrying member is constituted by a surface of the blade, there are three possible leakage paths along which fluid may communicate between the internal parts of the blade mounting and the exterior of the mechanism, to wit: (1) the interface between the first sealing ring and the blade-carrying member, to which the first ring is fitted, (2) the interface between the second sealing ring and the blade to which the second ring is fitted; and (3) a path consisting of the space between the second ring and the blade-carrying member, the space between the first and second sealing rings, and the space between the first ring and the blade-carrying member.

The first leakage path (1) is closed off by sealing the first sealing ring to the blade-carrying member, and the second leakage path (2) is closed off by sealing the second ring to the blade. The third path (3) is closed off by one of the two compressible sealing elements, alternative seals, i.e., the one of which is located between the two sealing rings and the other of which is located in the undercut, as described above. Accordingly, one of the two compressible sealing elements normally closes the third path, but the sealing device is constructed so that the sealing function can be shifted from the first compressible sealing element to the second compressible sealing element.

The specific arrangement described above can be modified by, for example, forming the undercut, not on the blade, but on the blade-carrying member. In this instance, the first ring, that is, the ring located in the undercut portion of the space between the blade and blade-carrying member, will be fitted to and form a seal with the blade, while the second ring will be fitted to and form a seal with the blade-carrying member. Bascially, this modification is merely a reversal of parts. Other modifications of the specific structure can also be readily made, but in any event, the sealing device of the invention embodies shiftable sealing rings and at least two compressible seal elements that are operable alternatively, depending upon which of the alternative positions the sealing rings occupy.

It is preferable that the sealing rings be non-rotatable on the respective parts to which they are fitted and with which they form a seal, thereby minimizing the possibility of any wear occurring. More particularly, as the blade is pivoted to change its pitch, the blade is rotated relative to the blade-carrying member, but by mounting the respective rings such that they are non-rotatable relative to the member to which they are fitted with which they form a seal, the seals are not exposed to relative rotation. Therefore, the possibility of wear and consequent leakage at those seals is practically non-existent.

On the other hand, the compressible sealing elements are subject to relative rotation of the parts between which they form seals, but in the event of wear or damage to one of them, the sealing device of the invention provides for quick and easy repair by merely shifting the sealing ring, using a mechanism that is operable externally of the blade and without any disassembly, to release one sealing element and engage the other. Thus, the invention makes it possible to stop a leak without the costly and time consuming dry-docking, in the case of ships, or drainage of fluid channels, in the case of turbines or pumps. A repair can be made under water by a diver using relatively simple tools and requires only a relatively short time to complete. Normal operation of the seal should be possible over a fairly long life and overhaul and replacement of the seals made at a more convenient time, preferably a time when other normal maintainence operations otherwise require dry-docking or drainage.

BRIEF DESCRIPTION OF THE DRAWING

For a better understanding of the invention, reference may be made to the following description of an exemplary embodiment, taken in conjunction with the figures of the accompanying drawings, in which.

DESCRIPTION OF EXEMPLARY EMBODIMENT

Figure 1:
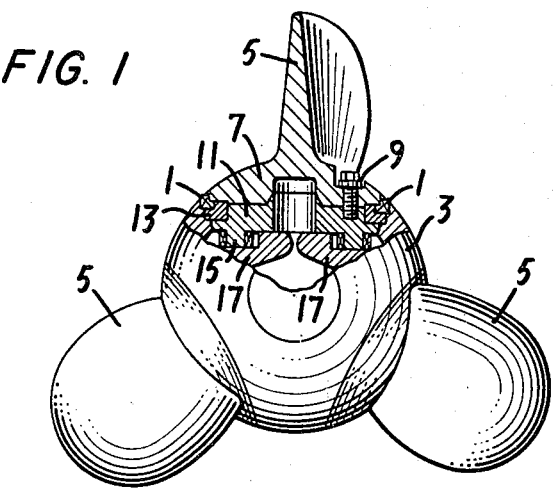
FIG. 1 is a rear view, partly in elevation and partly in section, of a propeller embodying the sealing device of the invention.

In FIG. 1, the main purpose of which is merely to indicate the location of a sealing device 1, according to the invention, as embodied in a ship propeller, the propeller includes a blade-carrying member or hub 3 equipped with three propeller blades 5. Each propeller blade 5 has a flange 7 and is fixed by bolts 9 installed through the flange 7 to a crank-pin ring 11. The propeller blade 5 and the crank-pin 11 are rotatably carried by a bearing ring 13 which is fitted to the hub 3. The crank-pin ring 11 is connected by means of crank-pins 15 to a pitch-setting mechanism 17, which may be of any suitable type, for pivoting the blade to change its pitch. The sealing device 1 is located generally in the region common to the hub 3, the blade flange 7 and the bearing ring 13.

Figure 2:
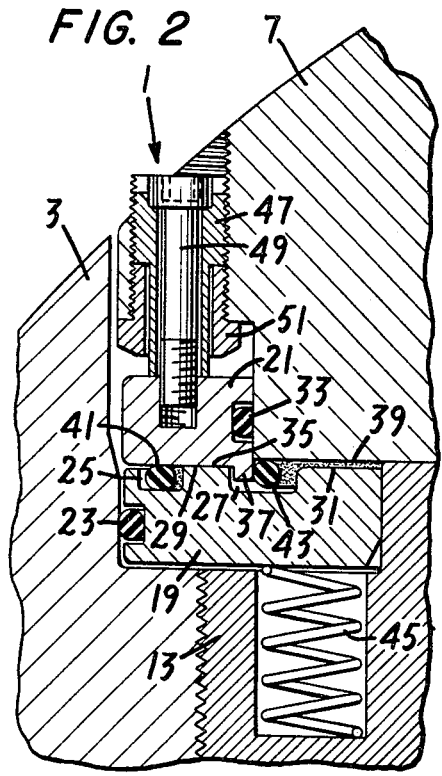
FIG. 2 is a partial, detailed view on a larger scale than FIG. 1, of one embodiment of the sealing device the view being in end section taken from the rear of the propeller as in FIG. 1, and generally along a plane through the axis of pivotal movement of the blade relative to the blade-carrying member.

Referring to FIG. 2, one embodiment of the sealing device 1 comprises a sealing ring 19 which is non-rotatably fitted to the hub 3, such as by a key (not shown) and another sealing ring 21 which is non-rotatably fitted to the blade flange 7. The sealing ring 19 is sealed, such as by a sealing element 23, against the hub 3 and has grooves 25 and 27 and sliding surfaces 29 and 31 on its outward face, with respect to the axis of the hub 3. The sealing ring 21 is sealed by a sealing element 33 against the blade flange 7 and has a sliding surface 35 and a tongue 37 on its inner face. The underside of the blade flange 7 has an inwardly facing sliding surface 39 that defines, in part, an undercut portion of an annular space between the blade flange 7 and the hub 3. In the groove 25 there is a compressible sealing element 41, and in the groove 27 is another compressible sealing element 43.

The sealing rings 19 and 21 are movable axially between alternate positions by providing clearance in the space where they are located, and means is provided for locating them in those positions but selectively shifting them when desired, the shifting operation being accomplished by manipulation of parts externally of the propeller and without removing the propeller or draining any oil in the hub. More particularly, the sealing ring 19 is urged outwardly in its axial direction by means of circumferentially spaced-apart springs 45, while the sealing ring 21 is movable in its axial direction by means of circumferentially spaced-apart adjusting screws 47 which are threaded into the propeller blade flange 7 and are locked by means of locking screws 49 threaded in the sealing ring 21. The outer ends of the adjusting screws 47 and the locking screws 49 are provided with grooves or slots for suitable tools so that they can easily be adjusted from the outside of the propeller. To limit the dislacement of the sealing ring 21 in the outward direction, spacer nuts 51 are threaded into the blade flange 7 from the inside.

The sealing device operates as follows. FIG. 2 shows the sealing device 1 as it should be initially positioned upon installation in the space between the hub 3, the blade flange 7 and the bearing ring 13. The springs 45 urge the sealing ring 19 against the sealing ring 21, which is held in an inward position by the adjusting screws 47 and the locking screws 49, the sliding surfaces 29 and 35 of the sealing rings 19 and 21 being in engagement with each other. In this position a seal between the oil-filled interior of the hub 3 and the medium in which the propeller operates is constituted by the sealing elements 23, 33 and 41.

The sealing elements 23 and 33 are located between surfaces that are non-rotatable with respect to each other, and consequently, they are not subject to any appreciable wear. The sealing element 41 is engaged, in somewhat compressed condition, between the abutting surfaces of the sealing rings 19 and 21 which, as the blade 5 is turned, move relative to each other, and the sealing element 41 is consequently exposed to wear. The extent of wear is also affected by sand or similar materials contained in the medium in which the mechanism operates which might penetrate as far as the sealing element 41. Meanwhile, the sealing element 43 is entirely unloaded and surrounded by oil; centrifugal force created by the rotation of the propeller holds the sealing element 43 outwardly against the underside of the blade flange 7 and the tongue 37, which are stationary in relation to each other, and the sealing element 43 thus does not engage any part of the groove 27 which, upon turning of the blade, moves relative to the blade flange 7 and the tongue 37. The sealing element 43 is, therefore, well protected against wear.

When the sealing element 41 becomes worn or if oil leaks out of the hub through the sealing device 1, the sealing element 43 is placed into operation as a substitute for the sealing element 41. This can be done comparatively simply under water by a frogman or diver in the following manner: the locking screws 49 are loosened somewhat so that their locking effect upon the adjustment screws 47 ceases; the adjustment screws 47 are then screwed outwards, causing the locking screws 49 to pull the sealing ring 21 outwardly; the springs 45 displace the sealing ring 19 outwardly so that the contact between the sliding surfaces 29 and 35, as well as the sealing function of the sealing element 41, are maintained all the times until the newly engaged sliding surfaces 31 and 39 are resting against each other and until the sealing element 43 is in operational position under a predetermined compression established upon engagement of the surfaces 31 and 39.

The oil-filled interior of the hub 3 and the medium surrounding the propeller are now sealed off from each other by sealing elements 23, 33 and 43. The sealing ring 21 may suitably be displaced until it reaches the spacer nuts 51. This position is indicated by the fact that the adjusting screws 47 cannot possibly be screwed out any further. The locking screws 49 are now retightened and the entire repair operation is thus completed. The worn or damaged sealing element 41 is entirely unloaded after the operation and does not interfere with the turning of the blade 3 to vary its pitch.

Figure 3:
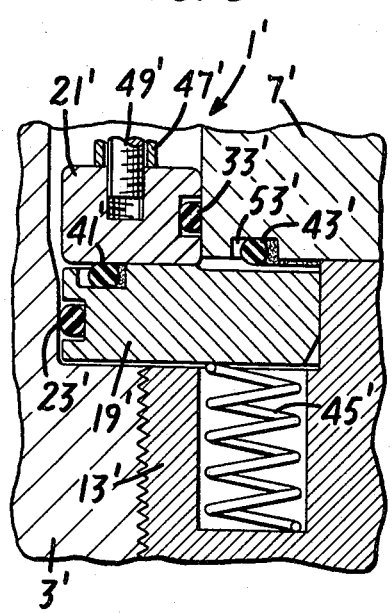
FIG. 3 is a view similar to FIG. 2 but showing a modification of the embodiment of FIG. 2.

FIG. 3 shows an alternative construction of the sealing device which is basically the same as that shown in FIG. 2 except for the cross-sectional shape of the sealing rings 19' and 21'. Accordingly, the same reference numerals as used above, but with prime (') suffixes, are used to identify the parts. In this embodiment, the sealing element 43' is received in a groove 53' formed in the blade flange 7', the groove 27 (FIG. 2) in the ring 19' and the tongue 37 (FIG. 2) on the ring 21 (FIG. 2) being omitted.

The above-described embodiment of the invention is intended to be merely exemplary, and those skilled in the art will be able to make numerous variations and modifications of it without departing from the spirit and scope of the invention. All such variations and modifications are intended to be included within the scope of the invention as defined in the appended claims.

We claim:

1. A sealing device for sealing the space between a rotatable variable-pitch blade member in a ship propeller, water turbine, pump or the like, the blade member being mounted for rotation to vary its pitch in a blade-carrying member, comprising a first sealing ring fitted to the blade member, a second sealing ring fitted to the blade-carrying member, the first and second sealing rings being displaceable relative to the blade-carrying member and the blade member between alternative positions, two annular compressible sealing elements coacting with at least one of the sealing rings and positioned thereon such that one is in operative sealing engagement when the sealing rings are in one of the alternative positions and the other sealing elements is in operative sealing engagement when the sealing rings are in the other alternative position, and means for shifting the sealing rings between their alternative positions.

2. A sealing device according to claim 1 wherein the means for shifting the sealing rings is operable from a location externally of the blade member and the blade-carrying member.

3. A sealing device according to claim 1 wherein the first sealing ring is non-rotatable with respect to the blade-carrying member and the second sealing ring is non-rotatable with respect to the blade member, and wherein the sealing rings are displaceable in their axial directions.

4. A sealing device according to claim 3 wherein the means for shifting the sealing rings includes adjusting screws received by one of the members and coupled to the sealing ring fitted to that member.

5. A sealing device according to claim 3 further comprising resilient means engaging one of the sealing rings and urging it in its axial direction.

6. A sealing device according to claim 1 wherein each of the compressible sealing elements is substantially entirely out of operative sealing engagement when the other sealing element is in operative sealing engagement.

7. A sealing device for a variable-pitch blade member in a ship propeller, water turbine pump, or the like, the blade member being rotatably carried by a blade-carrying member, the members having spaced coaxial cylindrical wall portions defining an annular space having an axis coincident with the axis of rotation of the blade, and the annular space being formed with an undercut in one of the members, comprising a first sealing ring received in the anular space and fitted non-rotatably to and sealed to the said one member, a second sealing ring received in the annular space and fitted non-rotatably to and sealed to the other of the members, the second sealing ring having a portion extending into the undercut, and the rings being shiftable axially with respect to the axis of pivotal movement of the blade member between alternative positions, a first compressible sealing element engageable between the two sealing rings and a second compressible sealing element engageable between the second sealing ring and a facing surface of the undercut, the first compressible sealing element being in sealing engagement between the two rings when the two rings are in one of the alternative positions and the second compressible sealing element being in operative sealing engagement with the said facing surface when the rings are in the other alternative position, and means coupled to the rings and operable from a position external of the blade member and blade-carrying member for shifting the rings between their alternative positions.

8. A sealing device according to claim 7 wherein the means for shifting the sealing rings includes resilient means positioned to urge the sealing elements generally outwardly with respect to the blade-carrying member and an adjustable positioning device carried by one of the members and coupled to the sealing ring fitted to that member engageable to limit the position of the sealing rings against the force of the resilient means.

9. A sealing device according to claim 7 wherein each of the compressible sealing elements is substantially entirely out of operative sealing engagement when the other sealing element is in operative sealing engagement.

References Cited

UNITED STATES PATENTS 2,530,520  11/1950  Hackethal et al. __ 170—160.58

FOREIGN PATENTS 947,583  1/1949  France.
487,233  11/1953  Italy.
58,258  9/1946  Netherlands.
264,087  9/1949  Switzerland.

EVERETTE A. POWELL, JR. *Primary Examiner.*